United States Patent
Luo et al.

(10) Patent No.: US 10,832,284 B2
(45) Date of Patent: Nov. 10, 2020

(54) METHOD AND DEVICE AND SYSTEM FOR PROCESSING PROMOTION INFORMATION

(71) Applicant: Tencent Technology (Shenzhen) Company Limited, Shenzhen (CN)

(72) Inventors: Chuanjiang Luo, Shenzhen (CN); Lei Xiao, Shenzhen (CN); Dapeng Liu, Shenzhen (CN); Lili Zhao, Shenzhen (CN); Peili Lv, Shenzhen (CN); Xue Bai, Shenzhen (CN); Jinjing Liu, Shenzhen (CN); Wei Xue, Shenzhen (CN); Miao Xu, Shenzhen (CN); Yang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 336 days.

(21) Appl. No.: 15/643,961

(22) Filed: Jul. 7, 2017

(65) Prior Publication Data
US 2018/0018700 A1    Jan. 18, 2018

Related U.S. Application Data

(63) Continuation of application No. PCT/CN2016/081587, filed on May 10, 2016.

(30) Foreign Application Priority Data

Jun. 26, 2015 (CN) .......................... 2015 1 0362231

(51) Int. Cl.
*G06Q 30/00* (2012.01)
*G06Q 30/02* (2012.01)
(Continued)

(52) U.S. Cl.
CPC ..... *G06Q 30/0256* (2013.01); *G06Q 30/0254* (2013.01); *G06Q 30/0269* (2013.01);
(Continued)

(58) Field of Classification Search
CPC . G06Q 30/0277; G06Q 30/0269; G06Q 30/02
See application file for complete search history.

(56) References Cited

U.S. PATENT DOCUMENTS 6,714,975 B1 * 3/2004 Aggarwal .............. G06Q 30/02
                                                        709/224
9,277,275 B1 * 3/2016 Arini ................. G06Q 30/0246
(Continued)

FOREIGN PATENT DOCUMENTS

CN      101694714 A      4/2010
CN      102136118 A      7/2011
(Continued)

OTHER PUBLICATIONS

Bonazzi; Business model considerations for private . . . ; 2010 IEEE; 8 pages ; 2010.*

(Continued)

*Primary Examiner* — Radu Andrei
(74) *Attorney, Agent, or Firm* — Anova Law Group, PLLC

(57) ABSTRACT

A method and device for processing promotion information and a system are provided. The method includes that: agreement information and exposure requirements of all promotion information within a preset period are acquired (101); directional delivered targets are determined according to the agreement information and the exposure requirements, and the directional delivered targets are split into multiple non-intersected delivered target sets (102); the promotion information is delivered to users corresponding to the corresponding delivered target sets according to the
(Continued)

exposure requirements (103); statistics about social propagation amounts of to the delivered promotion information is made in real time in a delivery process (104); and exposure parameters are corrected according to the social propagation amounts (105), so that delivery of the promotion information is regulated in real time. By the method, the effectiveness and accuracy of delivering the promotion information may be improved.

19 Claims, 8 Drawing Sheets

(51) Int. Cl.
    *G06Q 50/00*           (2012.01)
    *H04L 29/06*           (2006.01)
    *H04N 21/25*           (2011.01)

(52) U.S. Cl.
    CPC ............ *G06Q 50/01* (2013.01); *H04L 65/403* (2013.01); *H04N 21/252* (2013.01)

(56) References Cited

U.S. PATENT DOCUMENTS

| | | | |
|---|---|---|---|
| 2003/0091047 A1* | 5/2003 | Pate | H04L 47/20 370/392 |
| 2004/0204997 A1 | 10/2004 | Blaser | |
| 2009/0006156 A1* | 1/2009 | Hunt | G06Q 30/02 705/7.11 |
| 2009/0187461 A1* | 7/2009 | Brignull | G06Q 30/0204 705/7.33 |
| 2010/0031287 A1* | 2/2010 | Simon | H04N 7/173 725/38 |
| 2010/0114696 A1 | 5/2010 | Yang | |
| 2010/0211431 A1* | 8/2010 | Lutnick | G06Q 30/02 705/14.12 |
| 2011/0106611 A1* | 5/2011 | Chang | G06Q 30/02 705/14.42 |
| 2011/0246298 A1* | 10/2011 | Williams | G06Q 30/08 705/14.53 |
| 2013/0166395 A1* | 6/2013 | Vassilvitskii | G06Q 30/0244 705/14.73 |
| 2014/0046777 A1* | 2/2014 | Markey | G06O 30/02 705/14.66 |
| 2014/0122245 A1 | 5/2014 | Qu | |
| 2014/0172545 A1 | 6/2014 | Rabkin | |
| 2014/0330636 A1* | 11/2014 | Moran | G06T 1/0021 705/14.43 |

FOREIGN PATENT DOCUMENTS

| | | |
|---|---|---|
| CN | 102592235 A | 7/2012 |
| CN | 102790949 A | 11/2012 |
| CN | 103180870 A | 6/2013 |
| CN | 103544282 A | 1/2014 |
| CN | 103679513 A | 3/2014 |
| CN | 105046514 A | 11/2015 |
| JP | 2007515018 A | 6/2007 |
| JP | 2010515160 A | 5/2010 |
| JP | 2015501990 A | 1/2015 |

OTHER PUBLICATIONS

Kakola; Best Practices for International eSourcing of Software Products and Services; HICSS 2008, pp. 1-10; 2008.*
International Search Report for corresponding application PCT/CN2016/081587 filed on May 10, 2016; dated Aug. 10, 2016.

* cited by examiner

METHOD AND DEVICE AND SYSTEM FOR PROCESSING PROMOTION INFORMATION

CROSS REFERENCE TO RELATED APPLICATIONS

This application is a continuation of International Application No. PCT/CN/2016/081587, filed May 10, 2016, which claims priority to Chinese Patent Application No. 201510362231.1, filed on Jun. 26, 2015, the entire contents of which said applications are incorporated herein by reference.

TECHNICAL FIELD

The disclosure relates to the technical field of communication, and particularly to a method and a device and a system for processing promotion information.

BACKGROUND

Promotion information, as the name implies, refers to information which is needed to be promoted. Along with prosperous development of an Internet technology, the propagation mode of the promotion information, such as an advertisement, also gradually changes.

Taking the advertising as an example, the existing advertising usually mainly includes the agreement-based advertising, wherein the agreement-based advertising refers to an advertising form that an advertiser and an advertising platform come to an agreement to sell a specific number of advertising to a specific population within a specific time period and the advertiser pays according to the exposure. In order to implement allocation of agreement-based advertising, an existing agreement-based advertising system may usually include a booking module, an allocation module and a serving module, wherein the booking module is configured for an advertiser to submit agreement-based advertising, and may include some processing sub-modules of advertising input, advertising scheduling, exposure estimation and the like; the allocation module is a core module of agreement-based advertising, and may establish an association between an agreement and an exposure and implement the allocation of the agreement according to acquired data of all intraday agreements (agreement) and all intraday directional exposures (exposure) by virtue of sub-modules of advertising index, directional splitting, exposure estimation, offline allocation, exposure correction and the like; and the serving module is configured to play selected agreement-based advertising when users on line meet a requirement according to an allocation solution calculated by the allocation module.

In a researching and practicing process of a conventional art, the inventor of the invention finds that there is an error of the number of exposures during advertising allocation and advertising play in an existing solution, which causes that the allocation of the agreements may be not reasonable and influences the effectiveness and accuracy of delivering the promotion information.

SUMMARY

An embodiment of the invention provides a method and a device and a system for processing promotion information, which may improve the effectiveness and accuracy of delivering the promotion information.

The embodiment of the invention provides a method for processing promotion information, which includes that:

agreement information and exposure requirements of all promotion information within a preset period are acquired;

directional delivered targets are determined according to the agreement information and the exposure requirements, and the directional delivered targets are split into multiple non-intersected delivered target sets;

the promotion information is delivered to users corresponding to the corresponding delivered target sets according to the exposure requirements;

statistics about social propagation amounts of the delivered promotion information is made; and exposure parameters are corrected according to the social propagation amounts, and the step of delivering the promotion information to the users corresponding to the corresponding delivered target sets according to the exposure parameters is returned to perform;

wherein the delivering the promotion information to the users corresponding to the corresponding delivered target sets according to the exposure requirements comprises: estimating exposure amounts of each delivered target set; allocating exposure parameters in each delivered target set for each of the promotion information according to the exposure requirements and the exposure amounts, the exposure parameters comprising exposure priorities and exposure probabilities; and delivering the promotion information to the users corresponding to the corresponding delivered target sets according to the exposure parameters.

Correspondingly, the embodiment of the invention also provides a device for processing promotion information, which includes:

one or more processors; and one or more memories having instructions stored thereon, wherein the instructions, when executed by the one or more processors, cause the one or more processors to perform programming units comprising:

an acquiring unit, configured to acquire agreement information and exposure requirements of all promotion information within a preset period;

a splitting unit, configured to determine directional delivered targets according to the agreement information and the exposure requirements, and split the directional delivered targets into multiple non-intersected delivered target sets;

a delivering unit, configured to deliver the promotion information to users corresponding to the corresponding delivered target sets according to the exposure requirements;

a statistical unit, configured to make statistics about social propagation amounts of the promotion information; and a correcting unit, configured to correct exposure parameters according to the social propagation amounts, and trigger the delivering unit to execute the operation of delivering the promotion information to the users corresponding to the corresponding delivered target sets according to the exposure parameters;

wherein the delivering unit comprises an estimating subunit, an allocating subunit and a delivering subunit; the estimating subunit is configured to estimate exposure amounts of each delivered target set; the allocating subunit is configured to allocate exposure parameters in each delivered target set for each of the promotion information according to the exposure requirements and the exposure amounts, the exposure parameters comprising exposure priorities and exposure probabilities; and the delivering subunit is configured to deliver the promotion information to the users corresponding to the corresponding delivered target sets according to the exposure parameters.

In addition, the embodiment of the invention also provides an information recommendation system, which includes any device for processing the promotion information provided by the embodiment of the invention.

According to the embodiment of the invention, the agreement information and exposure requirement(s) of all the promotion information within a preset period are acquired; the directional delivered targets are determined according to the agreement information and the exposure requirement(s); the directional delivered targets are split into the multiple non-intersected delivered target sets, then the promotion information is delivered to users corresponding to the corresponding delivered target sets according to the exposure requirement(s); the statistics about the social propagation amounts of the delivered promotion information is made in real time in a delivery process, and the exposure parameters are corrected according to the social propagation amounts to regulate the delivery of the promotion information in real time. Since a real-time feedback mechanism is added when the promotion information is delivered in above solution, and a characteristic of additional exposures brought by social propagation is fully and effectively utilized during feedback, so as to make the allocation of the agreements more reasonable, and then greatly improve the effectiveness and accuracy of delivering the promotion information.

BRIEF DESCRIPTION OF THE DRAWINGS

In order to describe the technical solutions in the embodiment of the invention more clearly, drawings required to be used for descriptions in the embodiment will be simply introduced below. Obviously, the drawings described below are only some embodiments of the invention, and those skilled in the art may obtain other drawings according to these drawings without creative work.

DETAILED DESCRIPTION OF THE EMBODIMENTS

The technical solutions in the embodiment of the invention will be clearly and completely described below with reference to the drawings in the embodiment of the invention. Obviously, the described embodiments are not all embodiments but a part of the embodiments of the invention. All other embodiments obtained by those skilled in the art on the basis of the embodiments in the invention without creative work fall within the scope of protection of the invention.

The embodiment of the invention provides a method and device for processing promotion information and a system.

Figure 1A:
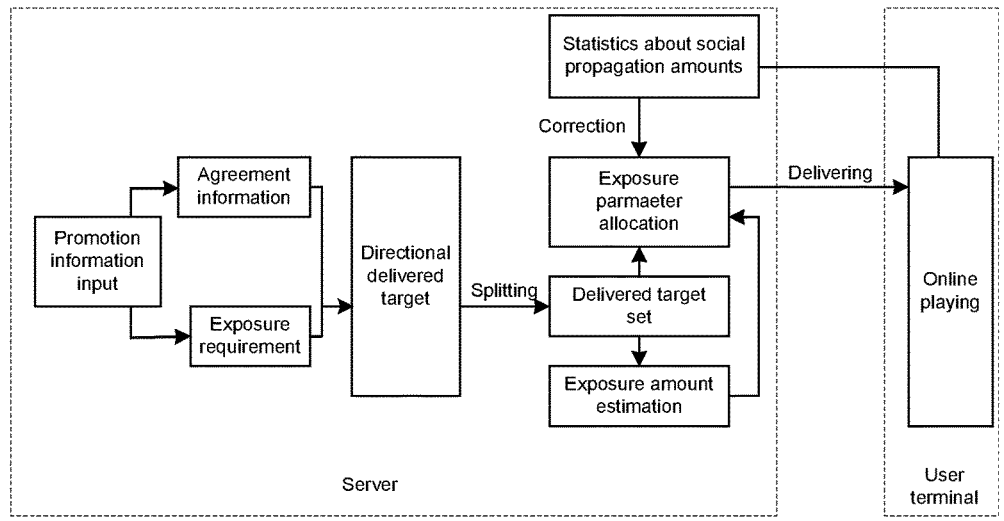
FIG. 1a is a scenario diagram of an information recommendation system according to an embodiment of the invention.

Referring to FIG. 1a, the information recommendation system may include a server, such as an advertising server, configured to deliver promotion information, wherein the server may include any device for processing promotion information provided by the embodiment of the invention. In addition, the information recommendation system may further include other equipment, such as a user terminal.

In the above, after input promotion information, such as advertising, is received, the server may acquire agreement information and exposure requirements of all the promotion information within a preset period, such as a day, then determine directional delivered targets according to the agreement information and the exposure requirements, and split the directional delivered targets into multiple non-intersected delivered target sets, and then may deliver the promotion information to users corresponding to the corresponding delivered target sets according to the exposure requirements. For example, exposure amounts of each delivered target set may specifically be estimated, exposure parameters, such as parameters of exposure priorities, exposure probabilities and the like are allocated for each of the promotion information in each delivered target set according to the exposure requirements and the exposure amounts, and then the promotion information is delivered to the users corresponding to the delivered target sets according to the exposure parameters, for example, the promotion information is sent to user terminals to which the users belong, and is played on line on the user terminals. After then, the server may also make statistics about social propagation amounts of the delivered promotion information, for example, making statistics about times of downloading, forwarding, commenting or replying to the promotion information by the users, then correct the exposure parameters according to the social propagation amounts and return to perform the step of delivering the promotion information to the users corresponding to the corresponding delivered target sets according to the exposure parameters, that is, the delivery of the promotion information is regulated in real time by virtue of a data backflow such as the social propagation amounts, so that the allocation of the agreements may be more reasonable, and the effectiveness and accuracy of delivering the promotion information are further improved.

Detailed descriptions will be made below respectively.

Embodiment 1

Descriptions will be made from the point of a device for processing promotion information in the embodiment, and the device for processing the promotion information may be integrated into a server configured to deliver the promotion information, such as equipment like an advertising server.

A method for processing promotion information includes that: agreement information and exposure requirements of all promotion information within a preset period are acquired; directional delivered targets are determined according to the agreement information and the exposure requirements, and the directional delivered targets are split into multiple non-intersected delivered target sets; the promotion information is delivered to users corresponding to the corresponding delivered target sets according to the exposure requirements; statistics about social propagation amounts of the promotion information is made; and exposure parameters are corrected according to the social propagation amounts, and the step is returned to be performed that the promotion information is delivered to the users corresponding to the corresponding delivered target sets according to the exposure parameters.

Figure 1B:
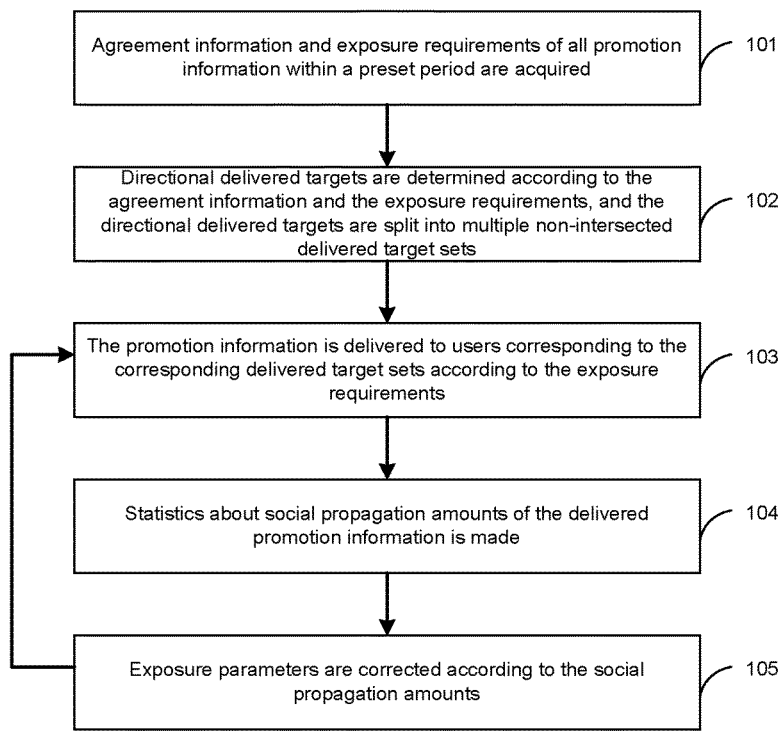
FIG. 1b is a flowchart of a method for processing promotion information according to an embodiment of the invention.

As shown in FIG. 1b, a specific flow of the method for processing the promotion information may comprise as follows.

101: The agreement information (demand) and exposure requirements (supply) of all the promotion information within the preset period are acquired.

In the above, a length of the period may be set according to a practical application requirement, and for example, may be set to be a day, that is, agreement information and exposure requirements of all the promotion information within a day may specifically be acquired. Of course, another time length may also be set, which will not be elaborated herein.

In the above, the agreement information refers to an agreement made between an information provision party and an information promotion party, such as an advertiser and an advertising platform, and is configured to indicate information such as a price, a directional condition and delivering time; and the exposure requirement refers to an exposure amount required to be reached by the promotion information under the directional condition and the delivering time indicated by the agreement.

102: The directional delivered targets are determined according to the agreement information and the exposure requirements, and the directional delivered targets are split into the multiple non-intersected delivered target sets.

In a practical application scenario, directional delivered targets of each of the promotion information are usually different, and may be intersected, so that the directional delivered targets are required to be split into the multiple non-intersected delivered target sets. In the above, there may be multiple splitting manners. For example, for directional delivered targets with age intersections, Cartesian product operation may be performed on them, such as "male, 20 years old", "male, 21 years old" and "male, 22 years old". A number of delivered target sets obtained by such a splitting manner is relatively larger although they may not be intersected, which may easily cause combination explosion. Therefore, another manner i.e. a tree structure manner, may also be adopted for splitting, specifically as follows:

directional attributes of the directional delivered targets are determined according to the agreement information, and the directional delivered targets are split in the tree structure manner according to the directional attributes to obtain a split tree, each layer of the split tree corresponding to a directional attribute, each leaf node corresponding to a delivered target set and each delivered target set being not intersected.

For example, the promotion information is the advertising. It is supposed that there are 6 pieces of advertising, i.e.: <advertising 1, male, 20-40>, <advertising 2, male, 30-50>, <advertising 3, male, 40-50>, <advertising 4, female, Beijing, Shanghai, Guangzhou and Shenzhen>, <advertising 5, female, 18-28, Beijing> and <advertising 6, male> respectively. Obviously, directional delivered targets of these advertising are intersected, so that the tree structure manner may be adopted to split these directional delivered targets, wherein each layer of a tree is a directional attribute, for example, a first layer is gender, a second layer is age. As shown in FIG. 1c~FIG. 1f, such a process may specifically be as follows.

Figure 1C:
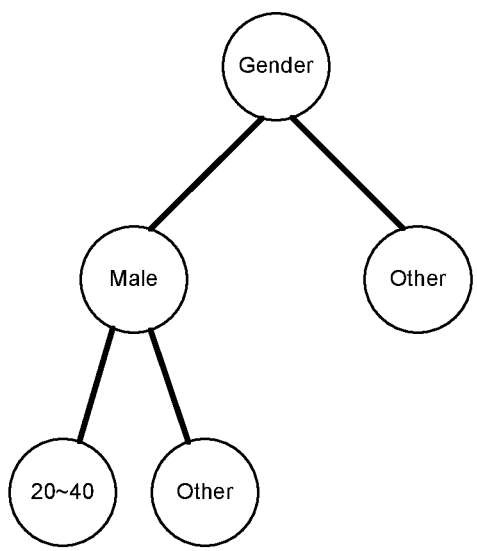
FIG. 1c is a diagram of splitting directional delivered targets in a method for processing promotion information according to an embodiment of the invention.

Referring to FIG. 1c, the directional delivered targets are split according to the advertising 1, three leaf nodes (finest granularity) may be formed, i.e. <male, 20-40>, <male, other> and <other>, all users are split into three non-intersected groups, and each leaf node represents a group.

Figure 1D:
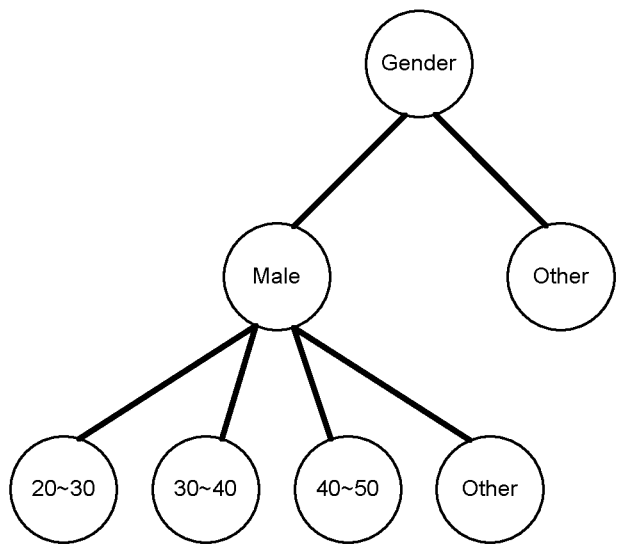
FIG. 1d is another diagram of splitting directional delivered targets in a method for processing promotion information according to an embodiment of the invention.

Referring to FIG. 1d, the directional delivered targets are split according to the advertising 2, and ages may be further split to form four non-intersected groups on the basis of splitting in FIG. 1c, i.e. "20~30" "30~40", "40~50" and "other". In such a manner, two more leaf nodes are formed compared with first splitting, that is, five leaf nodes may be formed after splitting of this time, i.e. <male, 20-30>, <male, 30-40>, <male, 40-50>, <male, other> and <other>, all the users are split into five non-intersected groups, and each leaf node represents a group.

Figure 1E:
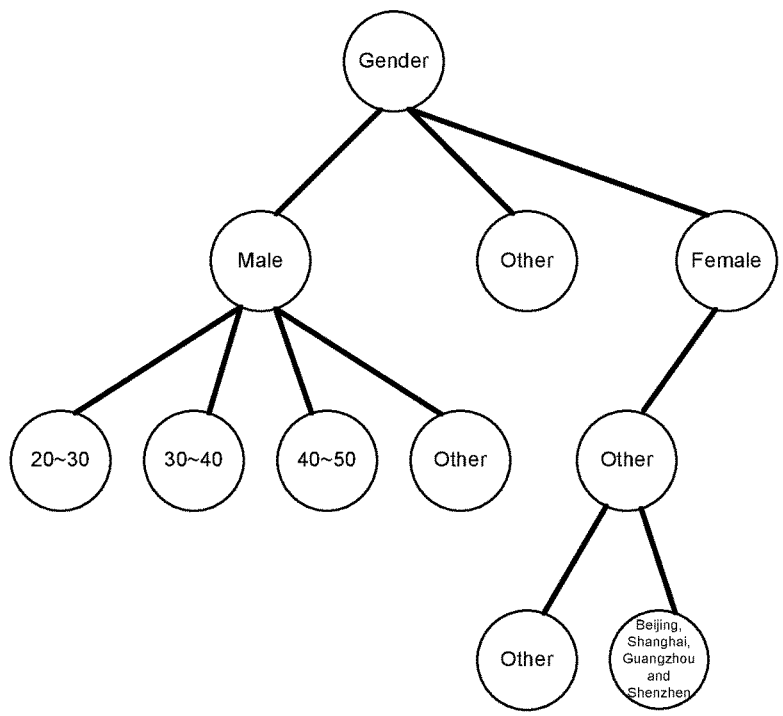
FIG. 1e is another diagram of splitting directional delivered targets in a method for processing promotion information according to an embodiment of the invention.
Figure 1F:
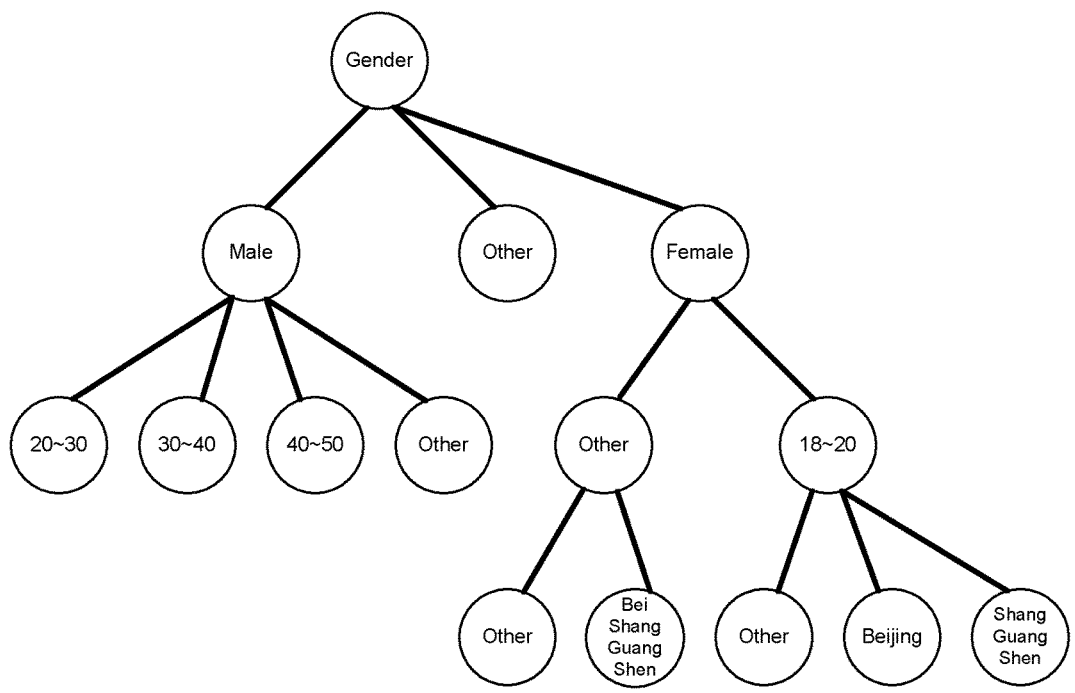
FIG. 1f is another diagram of splitting directional delivered targets in a method for processing promotion information according to an embodiment of the invention.

Similarly, referring to FIG. 1e, the directional delivered targets are split according to the advertising 3, and genders may be further split to obtain <female, other> and <female, Beijing, Shanghai, Guangzhou and Shenzhen> on the basis of splitting in FIG. 1d.

Still according to the manner, the groups may finally be split into sets with non-intersected granularities according to all directional conditions of the advertising. For example, referring to FIG. 1f, 10 non-intersected leaf nodes may finally be formed, i.e. <male, 20-30>, <male, 30-40>, <male, 40-50>, <male, other>, <other>, <female, other>, <female, Beijing, Shanghai, Guangzhou and Shenzhen>, <female, 18-28, other>, <female, 18-28, Beijing> and <female, 18-28, Shanghai, Guangzhou and Shenzhen>, then all the users may be split into 10 non-intersected groups, and each leaf node represents a group, so that non-intersected delivered target sets may be obtained.

It is important to be noted that: after the split tree is obtained, if there is new agreement information, for example, a new advertising is added, it is necessary to update the split tree, that is, after the step that "the directional delivered targets are split in the tree structure manner according to the directional attributes to obtain the split tree", the method for processing the promotion information may further include that:

when it is determined that there is new agreement information, the directional attributes of the directional delivered targets are updated, and the split tree is updated according to the updated directional attributes.

Figure 1G:
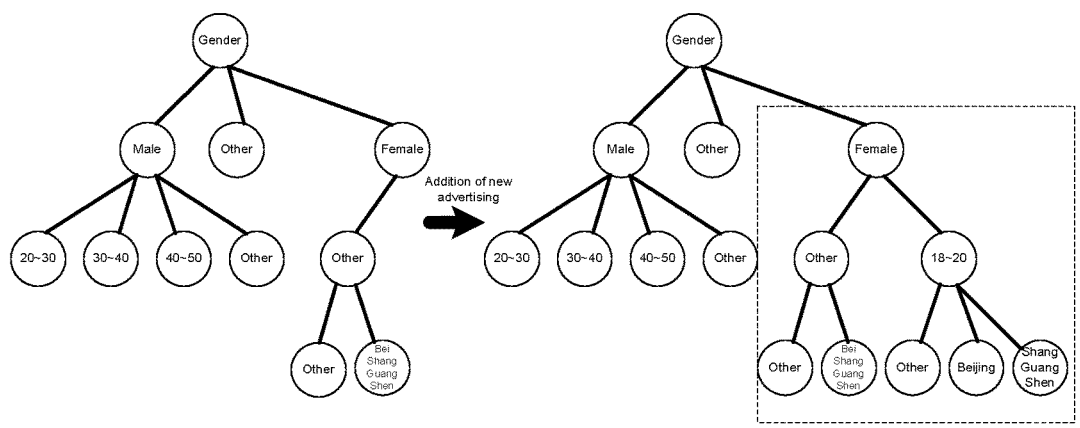
FIG. 1g is another diagram of splitting directional delivered targets in a method for processing promotion information according to an embodiment of the invention.

For example, the split tree may be re-established according to the updated directional attributes, or, the splitting may also be directly continued according to above same splitting manner to add a leaf node with a finer granularity on the basis of the original split tree. For example, referring to FIG. 1g, wherein a part in a dotted box is a node added due to the new addition of <advertising 5, female, 18-28, Beijing>.

103: The promotion information is delivered to the users corresponding to the corresponding delivered target sets according to the exposure requirements, which may, for example, be specifically as follows.

(1) Exposure amounts of each delivered target set are estimated.

For example, statistics about the exposure amounts of each leaf node, i.e. each delivered target set, may specifically be made on the basis of the split tree by virtue of historical log data.

(2) Allocation is performed on the exposure parameters in each delivered target set for each of promotion information according to the exposure requirements and the exposure amounts.

In the above, the exposure parameters may include parameters such as exposure priorities (order) and exposure probabilities (alpha).

For example, the exposure priorities of each of the promotion information in each delivered target set may be calculated according to the exposure requirements and the exposure amounts by virtue of a High Water Mark (HWM) algorithm (an algorithm for allocating the agreement-based advertising), and are sorted; then the corresponding promotion information is acquired in turn in the order of the exposure priorities from highest to lowest, and the exposure probabilities of the acquired promotion information in each delivered target set are calculated respectively according to the exposure requirements of the acquired promotion information and the exposure amounts of each delivered target set.

(3) The promotion information is delivered to the users corresponding to the corresponding delivered target sets according to the exposure parameters, which may, for example, be specifically as follows.

User information of the user(s) is acquired, and the delivered target set(s) to which the user(s) belong is determined according to the user information; the exposure priorities and exposure probabilities of each of promotion information in the delivered target set(s) to which the user(s) belongs are acquired; probability selection is performed in turn on the exposure probabilities of the corresponding promotion information according to the acquired exposure priorities; and the promotion information selected by probability selection is delivered to the user(s).

For example, when there is a user, all agreement-based advertising meeting a condition thereof may be sorted according to exposure priorities, probability selection is performed in turn according to exposure probabilities of the advertising, when the advertising sorted in the top is selected by the probability selection, the advertising sorted after above advertising in the top are abandoned, the selected advertising is exposed, and for example, the selected advertising may be sent to a user terminal and played on line in the user terminal.

104: The statistics about the social propagation amounts of the delivered promotion information is made.

In the above, the social propagation refers to a condition that the promotion information is additionally exposed by a social means, and for example, the promotion information is downloaded, forwarded, replied to, collected and/or commented. For example, the process may specifically be as follows.

Statistics about times of downloading, forwarding, replying to, collecting and/or commenting the delivered promotion information is made, and the calculation is performed on the times according to a preset algorithm to obtain the social propagation amounts of the delivered promotion information.

In the above, the preset algorithm may be set according to a practical application requirement, which is not elaborated herein.

105: The exposure parameters are corrected according to the social propagation amounts, and the step that the promotion information is delivered to the users corresponding to the corresponding delivered target sets according to the exposure parameters is returned to be performed, that is, returning to perform Step 103.

For example, by first allocation according to the HWM algorithm, advertising C may not be exposed and the exposure probability is 0, while both advertising A and advertising B may be exposed. After the exposure of a certain period of time, the advertising B is exposed more than normally requested due to a social propagation factor, so that a new allocation solution may finally be obtained by a data backflow and allocation correction. For example, the exposure probabilities of the advertising A and the advertising B are properly reduced to enable advertising C exposed for a certain number of times at this situation. Above operations are repeated in such a manner, so that all the advertising A, B and C may finally be exposed for sufficient amounts.

It is important to be noted that: besides the social propagation amounts may be taken as feedback data (i.e. the data backflow), some other factors, such as some data related to the delivering effects, may also be added into the feedback data, which will not be elaborated herein.

In an alternative embodiment, above method for processing promotion information is performed at an apparatus having one or more processors and one or more memories for storing instructions to be executed by the one or more processors. The instructions, when executed by the one or more processors, cause the one or more processors to perform above method.

From the above, according to the embodiment, the agreement information and exposure requirements of all the promotion information within the preset period are acquired, the directional delivered targets are determined according to the agreement information and the exposure requirements, the directional delivered targets are split into the multiple non-intersected delivered target sets, then the promotion information is delivered to the users corresponding to the corresponding delivered target sets according to the exposure requirements, the statistics about the social propagation amounts of the delivered promotion information is made in real time in a delivering process, and the exposure parameters are corrected according to the social propagation amounts so as to regulate the delivery of the promotion information in real time; and since a real-time feedback mechanism is added when the promotion information is delivered in the solution, and a characteristic of additional exposure brought by the social propagation is fully and effectively utilized during feedback, so that the allocation of the agreements may be more reasonable, and the effectiveness and accuracy of delivering the promotion information are further greatly improved.

Embodiment 2

According to the method described in embodiment 1, detailed descriptions will be further made below specifically with the condition that the promotion information is agreement-based advertising as an example, wherein a device for processing the promotion information may specifically be integrated into an advertising server.

Figure 2A:
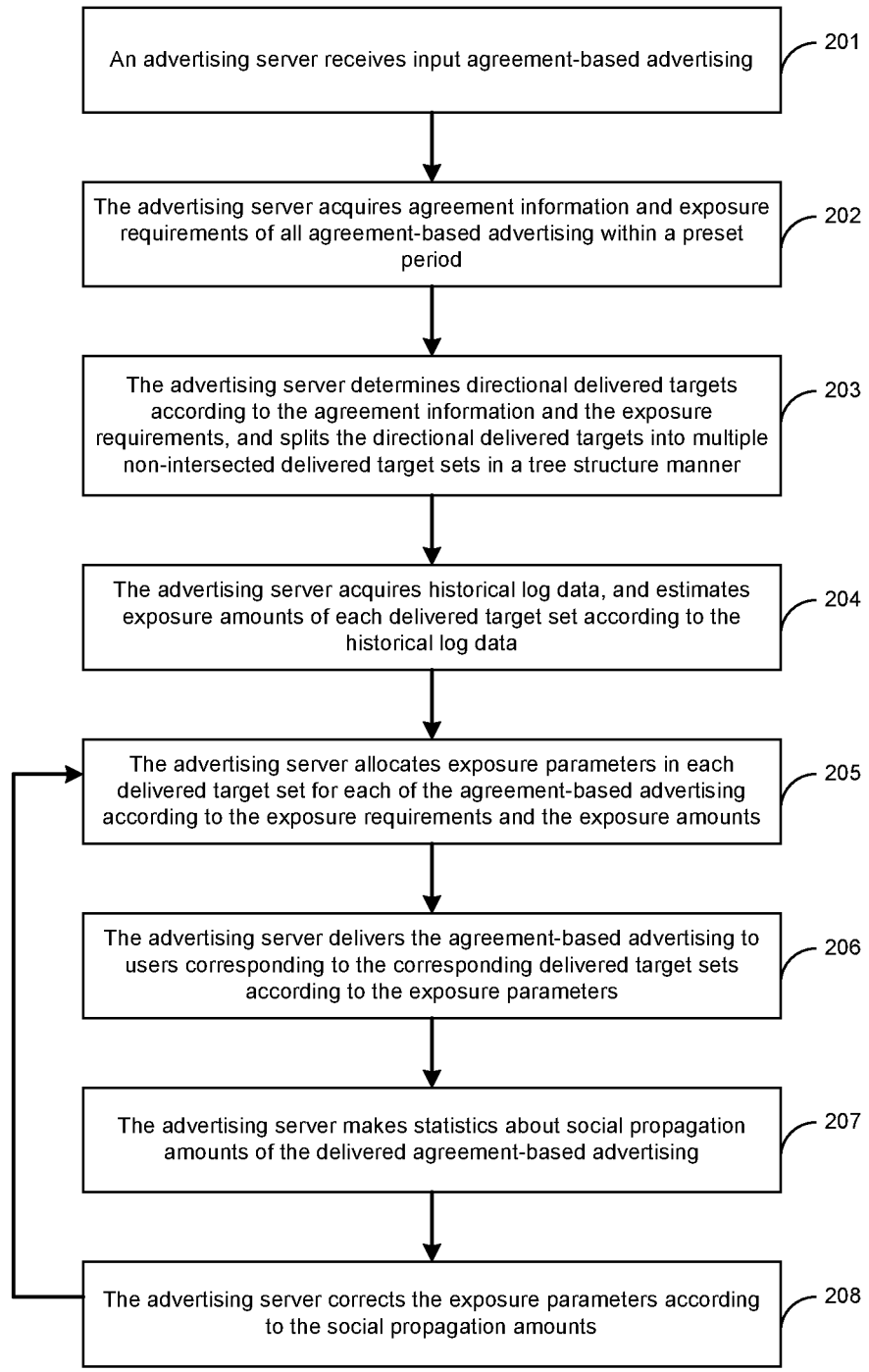
FIG. 2a is a flowchart of a method for processing promotion information according to an embodiment of the invention.

As shown in FIG. 2*a*, a specific flow of a method for processing promotion information may comprise as follows.

201: An advertising server receives input agreement-based advertising.

202: The advertising server acquires agreement information (demand) and exposure requirements (supply) of all agreement-based advertising within a preset period.

In the above, a length of the period may be set according to a practical application requirement, and for example, may be set to be a day, that is, agreement information and exposure requirements of all the agreement-based advertising within a day may specifically be acquired. Of course, another time length may also be set, which will not be elaborated herein.

203: The advertising server determines directional delivered targets according to the agreement information and the exposure requirements, and splits the directional delivered targets into multiple non-intersected delivered target sets in a tree structure manner.

For example, it is supposed that there are 6 pieces of advertising, i.e.: <advertising 1, male, 20-40>, <advertising 2, male, 30-50>, <advertising 3, male, 40-50>, <advertising 4, female, Beijing, Shanghai, Guangzhou and Shenzhen>, <advertising 5, female, 18-28, Beijing> and <advertising 6, male> respectively. All users may be split into 10 non-intersected groups, i.e. <male, 20-30>, <male, 30-40>, <male, 40-50>, <male, other>, <other>, <female, other>, <female, Beijing, Shanghai, Guangzhou and Shenzhen>, <female, 18-28, other>, <female, 18-28, Beijing> and <female, 18-28, Shanghai, Guangzhou and Shenzhen>, thereby obtaining 10 non-intersected delivered target sets. The process may specifically refer to related descriptions in embodiment 1 and FIG. 1c-FIG. 1f, and will not be elaborated herein.

204: The advertising server acquires historical log data, and estimates exposure amounts of each delivered target set according to the historical log data.

For example, for the delivered target sets <male, 20-30>, <male, 30-40>, <male, 40-50>, <female, 18-28, Beijing> and <female, 18-28, Shanghai, Guangzhou and Shenzhen>, it may be estimated according to the historical log data that exposure amounts of <male, 20-30>, <male, 30-40> and <male, 40-50> are all 1 million, an exposure amount of <female, 18-28, Beijing> is 0.8 million, an exposure amount of <female, 18-28, Shanghai, Guangzhou and Shenzhen> is 0.9 million, and the like.

205: The advertising server allocates exposure parameters of each of the agreement-based advertising in each delivered target set according to the exposure requirements and the exposure amounts.

For example, exposure priorities of each of the agreement-based advertising in each delivered target set may specifically be calculated according to the exposure requirements and the exposure amounts by virtue of an HWM algorithm, and are sorted, then the corresponding agreement-based advertising is acquired in turn according to exposure priorities sorted from highest to lowest, and the exposure probabilities of the agreement-based advertising in each delivered target set are calculated respectively according to the exposure requirements of the acquired agreement-based advertising and the exposure amounts of each delivered target set.

Figure 2B:
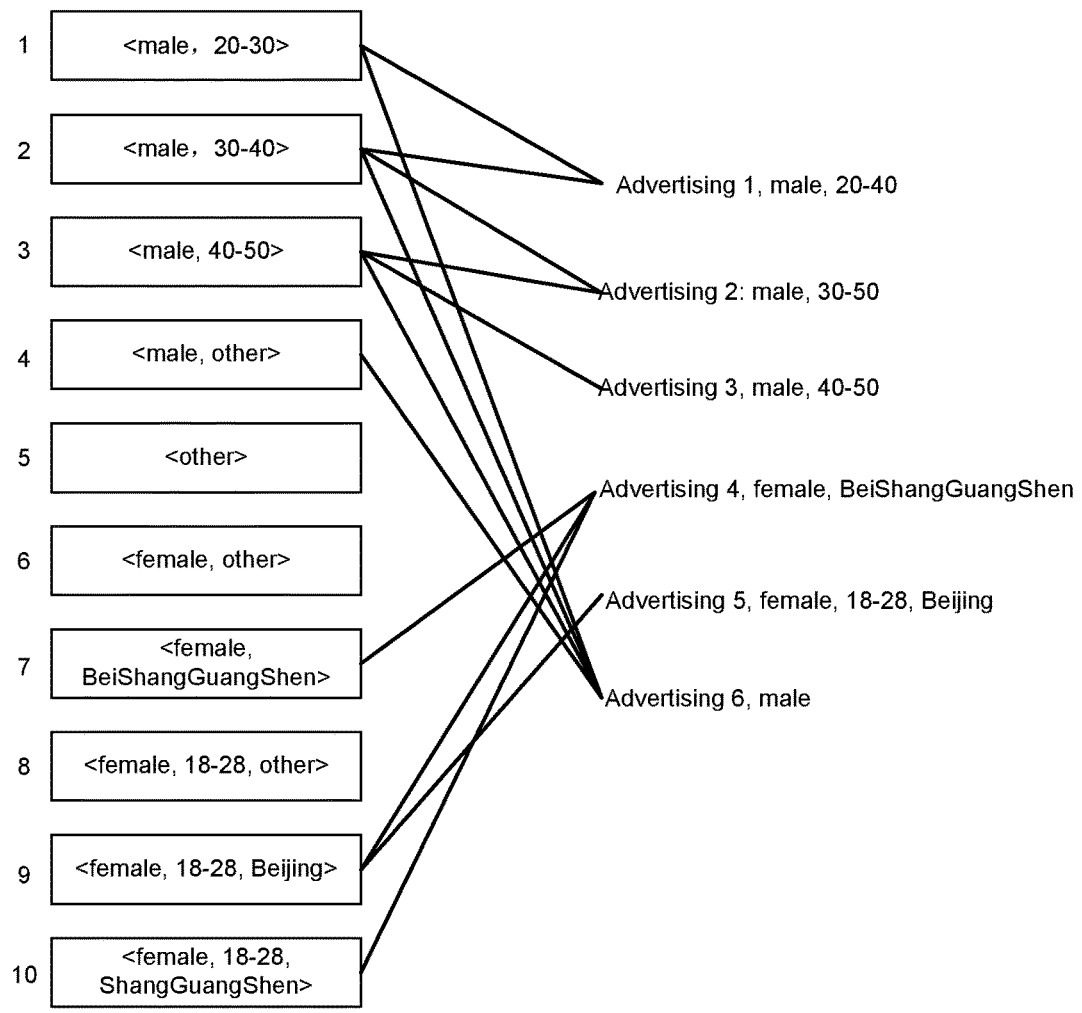
FIG. 2b is a schematic diagram of a corresponding relationship between advertising and a delivered target set in a method for processing promotion information according to an embodiment of the invention.

For example, still for <advertising 1, male, 20-40>, <advertising 2, male, 30-50>, <advertising 3, male, 40-50>, <advertising 4, female, Beijing, Shanghai, Guangzhou and Shenzhen>, <advertising 5, female, 18-28, Beijing> and <advertising 6, male>, as shown in FIG. 2b, a corresponding relationship between the six pieces of advertising and the 10 non-intersected delivered target sets obtained in Step 203 may be as follows:

<advertising 1, male, 20-40> corresponds to the delivered target sets 1 and 2, i.e. <male, 20-30> and <male, 30-40>;

<advertising 2, male, 30-50> corresponds to the delivered target sets 2 and 3, i.e. <male, 30-40> and <male, 40-50>;

<advertising 3, male, 40-50> corresponds to the delivered target set 3, i.e. <male, 40-50>;

<advertising 4, female, Beijing, Shanghai, Guangzhou and Shenzhen> corresponds to the delivered target sets 7, 9 and 10, i.e. <female, Beijing, Shanghai, Guangzhou and Shenzhen>, <female, 18-28, Beijing> and <female, 18-28, Shanghai, Guangzhou and Shenzhen>; <advertising 5, female, 18-28, Beijing> corresponds to the delivered target set 9, i.e. <female, 18-28, Beijing>; and <advertising 6, male> corresponds to the delivered target sets 1, 2, 3 and 4, i.e. <male, 20-30>, <male, 30-40>, <male, 40-50> and <male, other>.

For example, an exposure requirement of <advertising 1, male, 20-40> is 1 million, an exposure requirement of <advertising 2, male, 30-50> is 2 million, and exposure amounts of <male, 20-30>, <male, 30-40> and <male, 40-50> are respectively 1 million; and from the corresponding relationship, it can be seen that:

a meeting condition of the advertising 1 is a 2-million exposure amount (the exposure amount of 1 million of <male, 20-30> plus the exposure amount of 1 million of <male, 30-40>), so that a meeting degree of the advertising 1 is 200/100=2; and a meeting condition of the advertising 2 is a 2-million exposure amount (the exposure amount of 1 million of <male, 30-40> plus the exposure amount of 1 million of <male, 40-50>), so that a meeting degree of the advertising 2 is 200/200=1.

The exposure priorities are calculated in the order of the meeting degree from lowest to highest, wherein the exposure priority is higher if the meeting degree is lower, so that the order of the exposure priorities of the advertising 1 and the advertising 2 may be the advertising 2→the advertising 1.

Figure 2C:
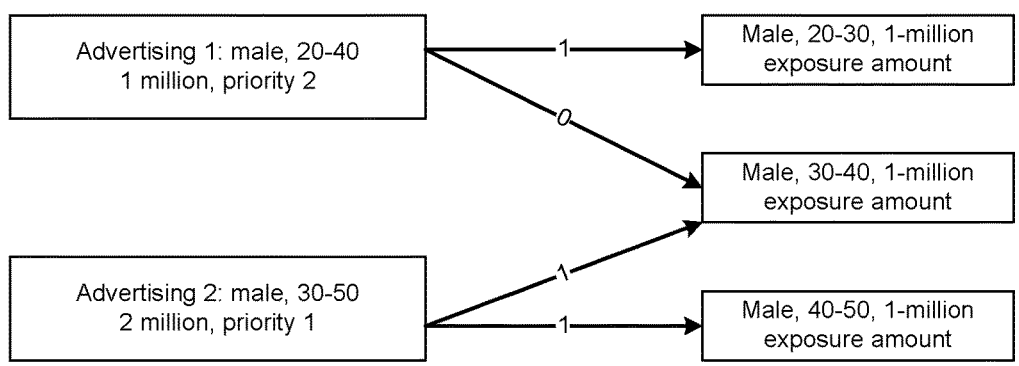
FIG. 2c is an allocation diagram of an exposure probability in a method for processing promotion information according to an embodiment of the invention.

The agreement-based advertising with relatively higher exposure priority may be preferably exposed according to its exposure requirement and the exposure amounts of each delivered target set, so that an exposure probability 1 may be allocated to the delivered target sets <male, 30-40> and <male, 40-50> according to the exposure requirement of the advertising 2 at this moment, and meanwhile, for the advertising 1, its exposure probability in the delivered target set <male, 20-30> may be set to be 1, but the exposure probability of the advertising 1 in the delivered target set <male, 30-40> may only be set to be 0 because the exposure probability of the advertising 2 has been set to be 1 at this moment, referring to FIG. 2c.

From the abovementioned exposure amounts and exposure probabilities, it can be seen that the expected exposure amount of the advertising 1 may reach: 100*1+100*1=200 million at this moment, the expected exposure amount of the advertising 2 may reach: 100*1+100*0=100 million, and both of them may meet the exposure requirements of the advertising 1 and the advertising 2.

206: The advertising server delivers the agreement-based advertising to users corresponding to the corresponding delivered target sets according to the exposure parameters.

For example, when there is a user, all agreement-based advertising meeting a condition thereof may be sorted according to exposure priorities, the probability selection is performed in turn according to exposure probabilities of the advertising, when the advertising sorted in the top is selected by the probability selection, the advertising sorted after the advertising in the top is abandoned, the selected advertising is exposed, and for example, the advertising may be sent to a user terminal and played on line in the user terminal. For example, when there is a user <male, 30-40>, the advertising 2 is exposed with the probability of 1, the advertising 1 is exposed with the probability of 0, and the like.

207: The advertising server makes statistics about social propagation amounts of the delivered agreement-based advertising.

For example, times of operations such as downloading, forwarding, replying to, collecting and/or commenting the agreement-based advertising may be made in a playing process, and the calculation may be performed on the times according to a preset algorithm to obtain the social propagation amounts of the advertising.

In the above, the preset algorithm may be set according to a practical application requirement, and will not be elaborated herein.

208: The advertising server corrects the exposure parameters according to the social propagation amounts, and returns to perform Step 205.

Figure 2D:
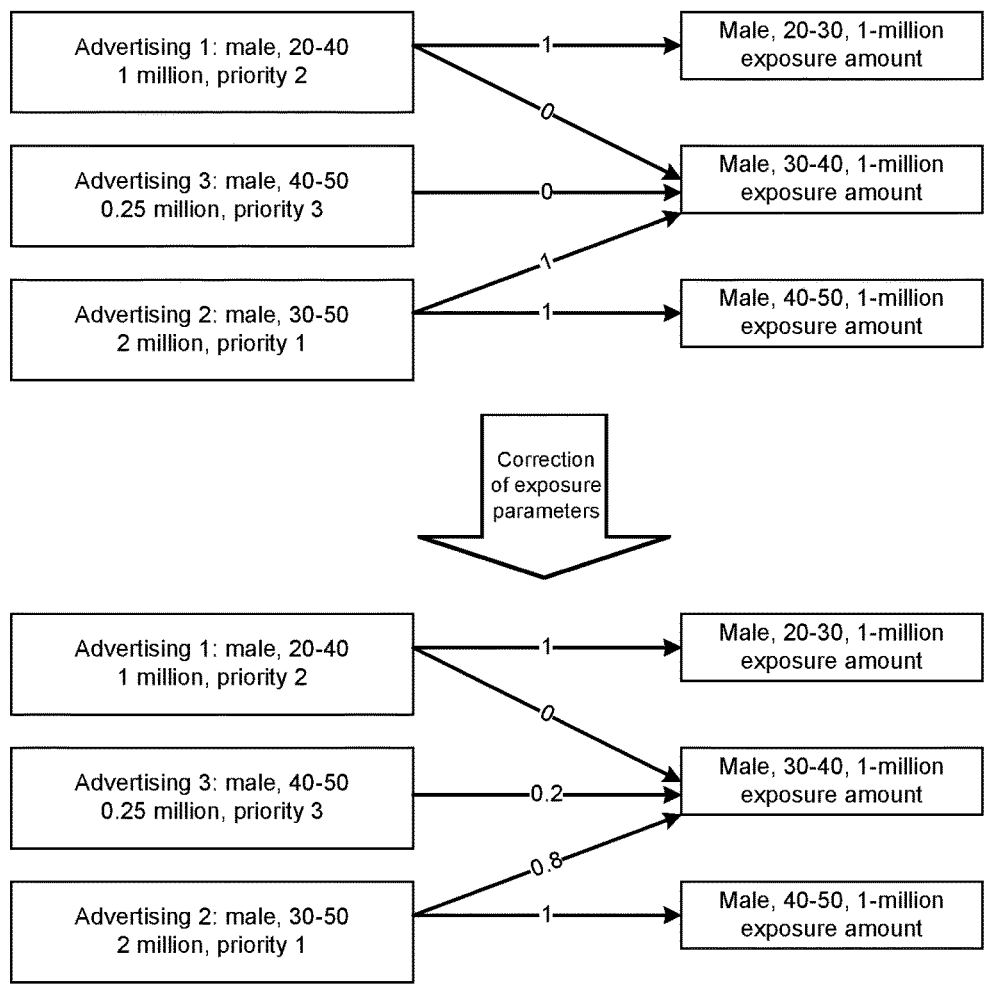
FIG. 2d is an allocation diagram after the correction of an exposure probability in a method for processing promotion information according to an embodiment of the invention.

For example, still in the example in Step 205, during first allocation, the exposure probabilities of the advertising 2 in the delivered target sets <male, 30-40> and <male, 40-50> are both 1, the exposure probability of the advertising 1 in the delivered target set <male, 20-30> is 1, the exposure probability of the advertising 1 in the delivered target set <male, 30-40> is 0, and it may be known that the exposure probability of <advertising 3, male, 40-50> in the delivered target set <male, 40-50> is 0, that is, the advertising 3 may not be exposed, referring to FIG. 2d. After the exposure of a certain period of time, the advertising 2 is exposed more than normally requested due to a social propagation factor. For example, an exposure propagation rate achieved by behaviors, such as commenting, forwarding and reply, of a group of the delivered target set <male, 30-40> is about 25%, that is, the advertising 2 may obtain an additional exposure amount of 0.25 million in the delivered target set <male, 30-40>, and at this moment, the social propagation amount (i.e. the additional exposure amount) may be fed back as a data backflow to correct allocation of the exposure parameters. For example, the exposure probability of the advertising 2 in the delivered target set <male, 30-40> is regulated from 1 to 0.8, and meanwhile, the exposure probability of the advertising 3 in the delivered target set <male, 30-40> is regulated from 0 to 0.2. In such a manner, an exposure amount of 1 million may still be achieved by combining additional exposure brought by social propagation although the exposure probability of the advertising 2 in the delivered target set <male, 30-40> is reduced, and at this moment, the advertising 3 may also be exposed for a certain number of times. By repeating above operations in such manner, the advertising 1, the advertising 2 and the advertising 3 may finally be exposed for sufficient times.

It is important to be noted that: besides the social propagation amounts may be taken as feedback data (i.e. the data backflow), some other factors, such as some data related to the delivering effects, may also be added into the feedback data, which will not be elaborated herein.

From the above, according to the embodiment, the agreement information and exposure requirements of all the promotion information within the preset period are acquired, the directional delivered targets are determined according to the agreement information and the exposure requirements, the directional delivered targets are split into the multiple non-intersected delivered target sets in a tree structure manner, then the promotion information is delivered to the users corresponding to the corresponding delivered target sets according to the exposure requirements, the statistics about the social propagation amounts of the delivered promotion information is made in real time in a delivering process, and the exposure parameters are corrected according to the social propagation amounts to regulate the delivery of the promotion information in real time; and since a real-time feedback mechanism is added when the promotion information is delivered in the solution, and a characteristic of additional supplies brought by social propagation is fully and effectively utilized during feedback, so that the allocation of the agreements may be more reasonable, and the effectiveness and accuracy of delivering the promotion information are further greatly improved.

In addition, the directional delivered targets are split in the tree structure manner, so that the directional delivered targets may be split into the multiple non-intersected delivered target sets in an as-few-as-possible combination manner to avoid combination explosion, reduce a storage space, also reduce calculation resources and improve processing efficiency.

Embodiment 3

Figure 3:
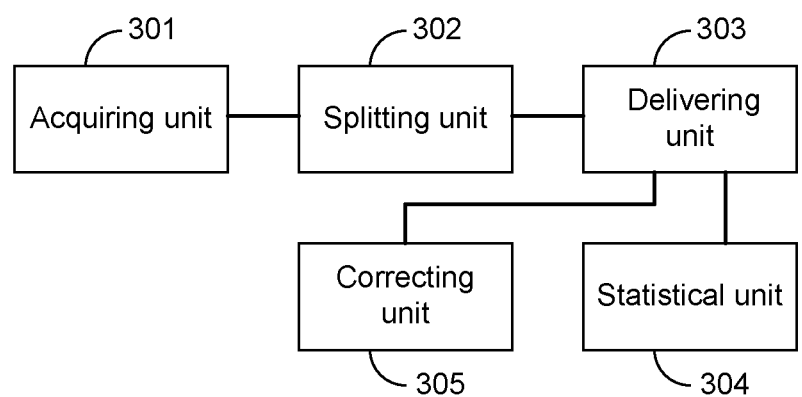
FIG. 3 is a structure diagram of a device for processing promotion information according to an embodiment of the invention.

In order to better implement the abovementioned method, the embodiment of the invention also provides a device for processing promotion information. As shown in FIG. 3, the device for processing the promotion information may include an acquiring unit 301, a splitting unit 302, a delivering unit 303, a statistical unit 304 and a correcting unit 305, as follows.

(1) The Acquiring Unit 301

The acquiring unit 301 is configured to acquire agreement information and exposure requirements of all promotion information within a preset period.

In the above, a length of the period may be set according to a practical application requirement, and for example, may be set to be a day, that is, agreement information and exposure requirements of all the promotion information within a day may specifically be acquired. Of course, another time length may also be set, which will not be elaborated herein.

(2) The Splitting Unit 302

The splitting unit 302 is configured to determine directional delivered targets according to the agreement information and the exposure requirements, and split the directional delivered targets into multiple non-intersected delivered target sets.

In the above, there may be multiple splitting manners. For example, for directional delivered targets with age intersections, Cartesian product operation may be performed on them, such as "male, 20 years old", "male, 21 years old" and "male, 22 years old". A number of delivered target sets obtained by such a splitting manner is relatively larger although they may not be intersected, which may easily cause combination explosion. Therefore, another manner i.e. a tree structure manner, may also be adopted for splitting, specifically as follows:

the splitting unit 302 may specifically be configured to determine directional attributes of the directional delivered targets according to the agreement information, and split the directional delivered targets in the tree structure manner according to the directional attributes to obtain a split tree, each layer of the split tree corresponding to a directional attribute, each leaf node corresponding to a delivered target set and each delivered target set being not intersected with each other. Specific descriptions may refer to embodiment 1, and will not be elaborated herein.

It is important to be noted that: after the split tree is obtained, if there is new agreement information, for example, new advertising is added, it is necessary to update the split tree, that is:

the splitting unit 302 may further be configured to, when it is determined that there is new agreement information, update the directional attributes of the directional delivered targets, and update the split tree according to the updated directional attributes.

For example, the split tree may be re-established according to the updated directional attributes, or, the splitting may also be directly continued according to above same splitting manner to add a leaf node with a finer granularity on the basis of the original split tree.

Details refer to embodiment 1, and will not be elaborated herein.

(3) The Delivering Unit 303

The delivering unit 303 is configured to deliver the promotion information to users corresponding to the corresponding delivered target sets according to the exposure requirements.

For example, the delivering unit 303 may include an estimating subunit, an allocating subunit and a delivering subunit, which are as follows:

the estimating subunit is configured to estimate exposure amounts of each delivered target set.

For example, statistics about the exposure amounts of each leaf node, i.e. each delivered target set, may specifically be made on the basis of the split tree by virtue of historical log data.

The allocating subunit is configured to allocate exposure parameters of each of the promotion information in each delivered target set according to the exposure requirements and the exposure amounts, the exposure parameters including exposure priorities and exposure probabilities.

In the above, the exposure parameters may include parameters such as the exposure priorities (order) and the exposure probabilities (alpha).

For example, the allocating subunit may specifically be configured to calculate and sort exposure priorities of each of the promotion information in each delivered target set according to the exposure requirements and the exposure amounts by virtue of an HWM algorithm, then acquire the corresponding promotion information in turn in the order of the exposure priorities sorted from highest to lowest, and respectively calculate the exposure probabilities of the acquired promotion information in each delivered target set according to the exposure requirements of the acquired promotion information and the exposure amounts of each delivered target set.

The delivering subunit is configured to deliver the promotion information to the users corresponding to the corresponding delivered target sets according to the exposure parameters.

For example, the delivering subunit may specifically be configured to acquire user information of the users, and determine the delivered target sets to which the users belong according to the user information; acquire the exposure priorities and exposure probabilities of each of the promotion information in the delivered target sets to which the users belong; perform probability selection on the exposure probabilities of the corresponding promotion information in turn according to the acquired exposure priorities; and deliver the promotion information selected by the probability selection to the users.

For example, when there is a user, all agreement-based advertising meeting a condition thereof may be sorted according to exposure priorities, the probability selection is performed in turn according to exposure probabilities of the advertising, the advertising sorted in the top is selected by the probability selection, the advertising sorted after the advertising in the top is abandoned, the selected advertising is exposed, and for example, the selected advertising may be sent to a user terminal and played on line in the user terminal.

(4) The Statistical Unit 304

The statistical unit 304 is configured to make statistics about the social propagation amounts of the delivered promotion information.

In the above, the social propagation refers to a condition that the promotion information is additionally exposed by a social means, and for example, the promotion information is downloaded, forwarded, replied to, collected and/or commented.

The statistical unit 304 may specifically be configured to make statistics about times of downloading, forwarding, replying to, collecting and/or commenting the delivered promotion information, and perform calculation on the times according to a preset algorithm to obtain the social propagation amounts of the delivered promotion information.

(5) The Correcting Unit 305

The correcting unit 305 is configured to correct the exposure parameters according to the social propagation amounts, and trigger the delivering unit 303 to execute the step of delivering the promotion information to the users corresponding to the corresponding delivered target sets according to the exposure parameters.

In the above, the preset algorithm may be set according to a practical application requirement, and will not be elaborated herein.

It is important to be noted that: besides the social propagation amounts may be taken as feedback data (i.e. a data backflow), some other factors, such as some data related to the delivering effects, may also be added into the feedback data, and then the correcting unit 305 corrects the exposure parameters according to the feedback data, which will not be elaborated herein.

In the above, the device for processing the promotion information may be integrated into a server configured to deliver the promotion information, such as equipment like the advertising server.

During specific implementation, each of the abovementioned units may be implemented as an independent entity, and may also be freely combined for implementation as the same or a plurality of entities, and specific implementation of each of the abovementioned units may refer to the abovementioned method embodiment, and will not be elaborated herein.

From the above, the acquiring unit 301 of the device for processing the promotion information in the embodiment may acquire the agreement information and exposure requirements of all the promotion information within the preset period, the splitting unit 302 determines the directional delivered targets according to the agreement information and the exposure requirements, and splits the directional delivered targets into the multiple non-intersected delivered target sets, then the delivering unit 303 delivers the promotion information to the users corresponding to the corresponding delivered target sets according to the exposure requirements, the statistical unit 304 makes the statistics about the social propagation amounts of the delivered promotion information in real time in a delivering process, and the correcting unit 305 corrects the exposure parameters according to the social propagation amounts so as to regulate the delivery of the promotion information in real time; and since a real-time feedback mechanism is added when the promotion information is delivered in the solution, and a characteristic of additional exposure brought by the social propagation is fully and effectively utilized during feedback, so that the allocation of the agreements may be more reasonable, and the effectiveness and accuracy of delivering the promotion information are further greatly improved.

In addition, the splitting unit 302 splits the directional delivered targets in the tree structure manner, so that the directional delivered targets may be split into the multiple non-intersected delivered target sets in an as-few-as-possible combination manner to avoid combination explosion, reduce a storage space, also reduce calculation resources and improve processing efficiency.

In an alternative embodiment, the device for processing promotion information comprises: one or more processors; and one or more memories having instructions stored thereon, wherein the instructions, when executed by the one or more processors, cause the one or more processors to perform programming units comprising above units, such as, acquiring unit 301, a splitting unit 302, a delivering unit 303, a statistical unit 304 and a correcting unit 305.

Embodiment 4

In addition, the embodiment of the invention also provides an information recommendation system, which includes any device for processing the promotion information provided by the embodiment of the invention, and details refer to embodiment 3. In the above, the device for processing the promotion information may be integrated into a server configured to deliver the promotion information, such as the equipment like the advertising server. For example, for an advertising server, descriptions may be made as follows.

The advertising server is configured to acquire agreement information and exposure requirements of all promotion information within a preset period; determine directional delivered targets according to the agreement information and the exposure requirements, and split the directional delivered targets into multiple non-intersected delivered target sets; deliver the promotion information to users corresponding to the corresponding delivered target sets according to the exposure requirements; make statistics about the social propagation amounts of the delivered promotion information; and correct the exposure parameters according to the social propagation amounts, and return to perform the step of delivering the promotion information to the users corresponding to the corresponding delivered target sets according to the exposure parameters.

For example, when the agreement-based advertising is delivered, the advertising server may specifically be configured to estimate exposure amounts of each delivered target set, allocate exposure parameters of each of the agreement-based advertising in each delivered target set according to exposure requirements and the exposure amounts, and deliver the agreement-based advertising to users corresponding to the corresponding delivered target sets according to the exposure parameters, specifically referring to the abovementioned embodiments.

In the above, there may be multiple manners for splitting the directional delivered targets into the multiple non-intersected delivered target sets, for example, which comprise as follows:

the advertising server may specifically be configured to determine directional attributes of the directional delivered targets according to the agreement information, and split the directional delivered targets in a tree structure manner according to the directional attributes to obtain a split tree, each layer of the split tree corresponding to a directional attribute, each leaf node corresponding to a delivered target set and each delivered target set being not intersected with each other.

It is important to be noted that: after the split tree is obtained, if there is new agreement information, for example, new advertising is added, it is necessary to update the split tree, that is:

the advertising server may further be configured to, when it is determined that there is new agreement information, update the directional attributes of the directional delivered targets, and update the split tree according to the updated directional attributes.

In addition, the information recommendation system may further include other equipment, such as a user terminal, as follows:

the user terminal is configured to receive the promotion information delivered by the device for processing the promotion information, for example, receiving the agreement-based advertising delivered by the advertising server.

Specific implementation of each of the abovementioned equipment may refer to the abovementioned embodiments, and will not be elaborated.

From the above, the information recommendation system of the embodiment may acquire the agreement information and exposure requirements of all the promotion information within the preset period, determine the directional delivered targets according to the agreement information and the exposure requirements, split the directional delivered targets into the multiple non-intersected delivered target sets, then deliver the promotion information to the users corresponding to the corresponding delivered target sets according to the exposure requirements, make the statistics about the social propagation amounts of the delivered promotion information in real time in a delivering process, and correct the exposure parameters according to the social propagation amounts so as to regulate the delivery of the promotion information in real time; and since a real-time feedback mechanism is added when the promotion information is delivered in the solution, and a characteristic of additional exposure brought by the social propagation is fully and effectively utilized during feedback, so that the allocation of the agreements may be more reasonable, and the effectiveness and accuracy of delivering the promotion information are further greatly improved.

In addition, the directional delivered targets are split in the tree structure manner, so that the directional delivered targets may be split into the multiple non-intersected delivered target sets in an as-few-as-possible combination manner to avoid combination explosion, reduce a storage space, also reduce calculation resources and improve processing efficiency.

Embodiment 5

Figure 4:
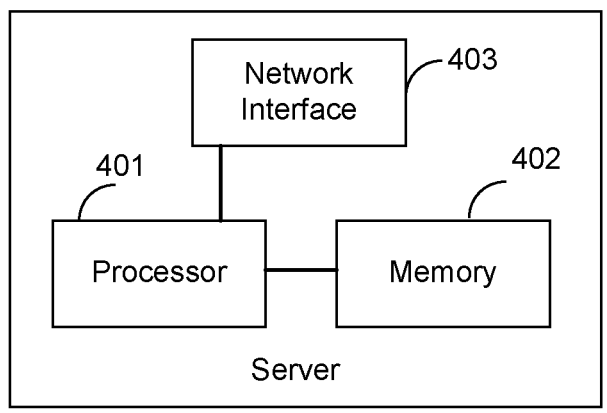
FIG. 4 is a structure diagram of a device for processing promotion information according to an embodiment of the invention.

According to the embodiment of the invention, referring to FIG. 4, a server configured to implement the abovementioned method for processing the promotion information is also provided, which mainly includes a processor 401, a memory 402 and a network interface 403. In the above, the memory 402 is mainly configured to store the promotion information.

The network interface 403 is mainly configured to perform network communication with a terminal.

The processor 401 is mainly configured to execute the following operations: acquiring agreement information and exposure requirements of all promotion information within a preset period; determining directional delivered targets according to the agreement information and the exposure requirements, and splitting the directional delivered targets into multiple non-intersected delivered target sets; delivering the promotion information to users corresponding to the corresponding delivered target sets according to the exposure requirements; making statistics about the social propagation amounts of the delivered promotion information; and correcting the exposure parameters according to the social propagation amounts, and returning to perform the step of delivering the promotion information to the users corresponding to the corresponding delivered target sets according to the exposure parameters.

The processor 401 is further configured to estimate exposure amounts of each delivered target set, allocate exposure parameters of each of the promotion information in each delivered target set according to the exposure requirements and the exposure amounts, the exposure parameters including exposure priorities and exposure probabilities, and deliver the promotion information to users corresponding to the corresponding delivered target sets according to the exposure parameters.

The processor 401 is further configured to calculate and sort the exposure priorities of each of the promotion information in each delivered target set according to the exposure requirements and the exposure amounts by virtue of an HWM algorithm, acquire the corresponding promotion information in turn in the order of the exposure priorities sorted from highest to lowest, and respectively calculate the exposure probabilities of the acquired promotion information in each delivered target set according to the exposure requirements of the acquired promotion information and the exposure amounts of each delivered target set.

The processor 401 is further configured to acquire user information of the users, and determine the delivered target sets to which the users belong according to the user information; acquire the exposure priorities and exposure probabilities of each piece of promotion information in the delivered target sets to which the users belong; perform probability selection on the exposure probabilities of the corresponding promotion information in turn according to the acquired exposure priorities; and deliver the promotion information selected by the probability selection to the users.

The processor 401 is further configured to determine directional attributes of the directional delivered targets according to the agreement information, and split the directional delivered targets in the tree structure manner according to the directional attributes to obtain a split tree, each layer of the split tree corresponding to a directional attribute, each leaf node corresponding to a delivered target set and each delivered target set being not intersected with each other.

Embodiment 6

The embodiment of the invention also provides a storage medium. Optionally, in the embodiment, the storage medium may be configured to store a program code for implementing a method for processing promotion information in the embodiment of the invention.

Optionally, in the embodiment, the storage medium may be located in at least one of network equipment in multiple of network equipment in a network such as a mobile communication network, a wide area network, a metropolitan area network or a local area network.

Optionally, in the embodiment, the storage medium is configured to store a program code configured to execute the following steps that: agreement information and exposure requirements of all promotion information within a preset period are acquired; directional delivered targets are determined according to the agreement information and the exposure requirements, and the directional delivered targets are split into multiple non-intersected delivered target sets; the promotion information is delivered to users corresponding to the corresponding delivered target sets according to the exposure requirements; statistics about social propagation amounts of the promotion information is made; and exposure parameters are corrected according to the social propagation amounts, and the step that the promotion information is delivered to the users corresponding to the corresponding delivered target sets according to the exposure parameters is returned to be performed.

Optionally, in the embodiment, the step that the promotion information is delivered to the users corresponding to the corresponding delivered target sets according to the exposure requirements includes that: exposure amounts of each delivered target set are estimated; the exposure parameters of each of the promotion information in each delivered target set are allocated according to the exposure requirements and the exposure amounts, wherein the exposure parameters comprise exposure priorities and exposure probabilities; and the promotion information is delivered to the users corresponding to the corresponding delivered target sets according to the exposure parameters.

Optionally, in the embodiment, the step that the exposure parameters of each of the promotion information in each delivered target set are allocated according to the exposure requirements and the exposure amounts includes that: exposure priorities of each of the promotion information in each delivered target set are calculated according to the exposure requirements and the exposure amounts by virtue of an HWM algorithm, and are sorted; the corresponding promotion information is acquired in turn in the order of the exposure priorities sorted from highest to lowest; and the exposure probabilities of the acquired promotion information in each delivered target set are calculated respectively according to the exposure requirements of the acquired promotion information and the exposure amounts of each delivered target set.

Optionally, in the embodiment, the step that the promotion information is delivered to the users corresponding to the corresponding delivered target sets according to the exposure parameters includes that: user information of the users is acquired, and the delivered target sets to which the users belong are determined according to the user information; the exposure priorities and exposure probabilities of each of the promotion information in the delivered target sets to which the users belong are acquired; probability selection is performed on the exposure probabilities of the corresponding promotion information in turn according to the acquired exposure priorities; and the promotion information selected by the probability selection is delivered to the users.

Optionally, in the embodiment, the step that the directional delivered targets are split into the multiple non-intersected delivered target sets includes that: directional attributes of the directional delivered targets are determined according to the agreement information; and the directional delivered targets are split in the tree structure manner according to the directional attributes to obtain a split tree, each layer of the split tree corresponding to a directional attribute, each leaf node corresponding to a delivered target set and each delivered target set being not intersected with each other.

Optionally, in the embodiment, after the step that the directional delivered targets are split in the tree structure manner according to the directional attributes to obtain the split tree, the following steps are included: when it is determined that there is new agreement information, the directional attributes of the directional delivered targets are updated; and the split tree is updated according to the updated directional attributes.

Optionally, in the embodiment, the statistics about the social propagation amounts of the delivered promotion information is made includes that: statistics about times of forwarding, replying to, collecting and/or commenting the delivered promotion information is made; and the calculation is performed on the times according to a preset algorithm to obtain the social propagation amounts of the delivered promotion information. Optionally, in the embodiment, the storage medium may include, but not limited to: various media capable of storing program codes such as a U disk, a Read-Only Memory (ROM), a Random Access Memory (RAM), a mobile hard disk, a magnetic disk or an optical disk.

Those skilled in the art should know that all or part of the steps in various methods of the abovementioned embodiments may be implemented by instructing related hardware by a program, the program may be stored in a computer-readable storage medium, and the storage medium may include: a ROM, a RAM, a magnetic disk, an optical disk or the like.

The method and device for processing the promotion information and system provided by the embodiment of the invention are introduced above in detail, the principle and implementation modes of the invention are elaborated with specific examples in the invention, and descriptions in the abovementioned embodiments are only adopted to help the method of the invention and its core concept to be understood; and in addition, those skilled in the art may make variations to specific implementation modes and the scope of application according to the concept of the invention. From the above, the content of the specification should not be understood as a limit to the invention.

What is claimed is:

1. A method for processing promotion information, performed by a server, comprising:
    acquiring agreement information and exposure requirements of promotion information within a preset period, the promotion information including first and second promotion information respectively with first and second exposure requirements;
    determining directional delivered targets according to the agreement information and the exposure requirements, delivering the promotion information to users corresponding to the directional delivered targets, and splitting the directional delivered targets into multiple non-intersected delivered target sets, the multiple non-intersected delivered target sets including first, second, and third target sets respectively with first, second, and third exposure amounts;
    determining a first ratio of a combined sum of the first and second exposure amounts relative to the first exposure requirement, and determining a second ratio of a combined sum of the second and third exposure amounts relative to the second exposure requirement;
    upon determining the second ratio is greater in value than the first ratio, prioritizing delivery of the second promotion information over the first promotion information;
    making statistics about social propagation amounts of the delivered promotion information;
    correcting exposure parameters according to the social propagation amounts;
    wherein the delivering the promotion information to the users corresponding to the directional delivered targets includes: estimating exposure amounts of each delivered target set; and allocating exposure parameters in each delivered target set for each of the promotion information according to the exposure requirements and the exposure amounts, the exposure parameters including exposure priorities and exposure probabilities;
    wherein the agreement information refers to an agreement made between an information provision party and an information promotion party, and is configured to indicate the following information: a price, a directional condition and delivering time;
    wherein the exposure requirement refers to an exposure amount required to be reached by the promotion information under the directional condition and the delivering time indicated by the agreement.

2. The method according to claim 1, further comprising:
    calculating and sorting exposure priorities of each of the promotion information according to a High Water Mark (HWM) algorithm to obtain an order of the exposure priorities sorted from highest to lowest; and
    calculating exposure probabilities according to the order of the exposure priorities.

3. The method according to claim 1, wherein delivering the promotion information to the users corresponding to the directional delivered targets comprises:
    acquiring user information of the users, and determining the directional delivered targets according to the user information;
    performing probability selection on the exposure probabilities; and
    delivering the promotion information according to the probability selection to the users.

4. The method according to claim 1, wherein splitting the directional delivered targets into the multiple non-intersected delivered target sets comprises:
    determining directional attributes of the directional delivered targets according to the agreement information; and
    splitting the directional delivered targets according to the directional attributes to obtain a split tree, each layer of the split tree corresponding to one of the directional attributes, and each leaf node of the split tree corresponding to one of the delivered targets.

5. The method according to claim 4, further comprising:
    updating the directional attributes of the directional delivered targets; and
    updating the split tree according to the directional attributes as updated.

6. The method according to claim 1, wherein making the statistics about the social propagation amounts of the delivered promotion information comprises:
   making statistics about times of forwarding, replying to, collecting and/or commenting the delivered promotion information; and
   performing calculation on the times according to a preset algorithm to obtain the social propagation amounts of the delivered promotion information.

7. A device for processing promotion information, comprising a memory and a processor coupled to the memory, the processor being configured to:
   acquire agreement information and exposure requirements of promotion information within a preset period, the promotion information including first and second promotion information respectively with first and second exposure requirements;
   determine directional delivered targets according to the agreement information and the exposure requirements, delivering the promotion information to users corresponding to the directional delivered targets, and split the directional delivered targets into multiple non-intersected delivered target sets, the multiple non-intersected delivered target sets including first, second, and third target sets respectively with first, second, and third exposure amounts;
   determine a first ratio of a combined sum of the first and second exposure amounts relative to the first exposure requirement, and determine a second ratio of a combined sum of the second and third exposure amounts relative to the second exposure requirement;
   upon determining the second ratio is greater in value than the first ratio, prioritize delivery of the second promotion information over the first promotion information;
   make statistics about social propagation amounts of the promotion information; and
   correct exposure parameters according to the social propagation amounts;
   wherein the delivering the promotion information to the users corresponding to the directional delivered targets includes: estimating exposure amounts of each delivered target set; and allocating exposure parameters in each delivered target set for each of the promotion information according to the exposure requirements and the exposure amounts, the exposure parameters including exposure priorities and exposure probabilities;
   wherein the agreement information refers to an agreement made between an information provision party and an information promotion party, and is configured to indicate the following information: a price, a directional condition and delivering time;
   wherein the exposure requirement refers to an exposure amount required to be reached by the promotion information under the directional condition and the delivering time indicated by the agreement.

8. The device according to claim 7, wherein the processor is further configured to:
   calculate and sort exposure priorities of each of the promotion information according to a High Water Mark (HWM) algorithm to obtain an order of the exposure priorities sorted from highest to lowest; and
   calculate exposure probabilities according to the order of the exposure priorities.

9. The device according to claim 7, wherein the processor is further configured to:
   acquire user information of the users, and determine the directional delivered targets according to the user information;
   perform probability selection on the exposure probabilities; and
   deliver the promotion information according to the probability selection to the users.

10. The device according to claim 7, wherein the processor is further configured to:
    determine directional attributes of the directional delivered targets according to the agreement information; and
    split the directional delivered targets according to the directional attributes to obtain a split tree, each layer of the split tree corresponding to one of the directional attributes, and each leaf node of the split tree corresponding to one of the delivered targets.

11. The device according to claim 10, wherein the processor is further configured to:
    update the directional attributes of the directional delivered targets; and
    update the split tree according to the directional attributes as updated.

12. The device according to claim 7, wherein the processor is further configured to:
    make statistics about times of forwarding, replying to, collecting and/or commenting the delivered promotion information; and
    perform calculation on the times according to a preset algorithm to obtain the social propagation amounts of the delivered promotion information.

13. An information recommendation system, comprising the device for processing the promotion information according to claim 7 and a user terminal, wherein the user terminal is configured to receive the promotion information delivered by the device for processing the promotion information.

14. The method according to claim 2, wherein delivering the promotion information to the users corresponding to the corresponding delivered target sets according to the exposure parameters comprises:
    acquiring user information of the users, and determining the directional delivered targets according to the user information;
    performing probability selection on the exposure probabilities; and
    delivering the promotion information according to the probability selection to the users.

15. The method according to claim 2, wherein splitting the directional delivered targets into the multiple non-intersected delivered target sets comprises:
    determining directional attributes of the directional delivered targets according to the agreement information; and
    splitting the directional delivered targets according to the directional attributes to obtain a split tree, each layer of the split tree corresponding to one of the directional attributes, and each leaf node corresponding to one of the directional delivered targets.

16. The method according to claim 2, wherein making the statistics about the social propagation amounts of the delivered promotion information comprises:
    making statistics about times of forwarding, replying to, collecting and/or commenting the delivered promotion information; and
    performing calculation on the times according to a preset algorithm to obtain the social propagation amounts of the delivered promotion information.

17. The device according to claim 8, wherein the processor is further configured to:
- acquire user information of the users, and determine the directional delivered targets according to the user information;
- perform probability selection on the exposure probabilities; and
- deliver the promotion information according to the probability selection to the users.

18. The device according to claim 8, wherein the processor is further configured to:
- determine directional attributes of the directional delivered targets according to the agreement information; and
- split the directional delivered targets according to the directional attributes to obtain a split tree, each layer of the split tree corresponding to one of the directional attributes, and each leaf node corresponding to one of the directional delivered targets.

19. The device according to claim 8, wherein the processor is further configured to:
- make statistics about times of forwarding, replying to, collecting and/or commenting the delivered promotion information; and
- perform calculation on the times according to a preset algorithm to obtain the social propagation amounts of the delivered promotion information.

* * * * *